United States Patent
Bang et al.

(10) Patent No.: US 8,830,646 B2
(45) Date of Patent: Sep. 9, 2014

(54) PROTECTION COORDINATION SYSTEM

(75) Inventors: Seung Hyun Bang, Busan (KR); Kwon Bae Park, Daejeon (KR); Won Joon Choe, Cheongju-si (KR); Jung Wook Sim, Cheongju-si (KR); Gyeong Ho Lee, Cheongju-si (KR); Hae Yong Park, Masan-si (KR); Min Jee Kim, Seoul (KR)

(73) Assignee: LSIS Co., Ltd., Anyang-si, Gyeonggi-do (KR)

( * ) Notice: Subject to any disclaimer, the term of this patent is extended or adjusted under 35 U.S.C. 154(b) by 70 days.

(21) Appl. No.: 13/546,797

(22) Filed: Jul. 11, 2012

(65) Prior Publication Data
US 2013/0021707 A1 Jan. 24, 2013

(30) Foreign Application Priority Data

Jul. 22, 2011 (KR) .................. 10-2011-0073227

(51) Int. Cl.
*H02H 3/08* (2006.01)
(52) U.S. Cl.
USPC ....................................... 361/93.1
(58) Field of Classification Search
CPC ....... H01H 75/00; H01H 79/00; H01H 81/00; H01H 83/00; H01H 81/04; H01H 83/02; H01H 83/06; H01H 71/1081; H02H 9/008; H02H 9/02; H02H 7/261; H02H 3/06; H02H 3/087; H02H 9/025; G05F 1/573
See application file for complete search history.

(56) References Cited

U.S. PATENT DOCUMENTS 4,724,502 A * 2/1988 Kawahira et al. ............... 361/62

FOREIGN PATENT DOCUMENTS

| CN | 1059623 | 3/1992 |
| CN | 101505056 | 8/2009 |
| JP | 446521 | 2/1992 |
| JP | 10208954 | 8/1998 |
| JP | 2000032662 | 1/2000 |
| JP | 2000090788 | 3/2000 |
| JP | 200210481 | 1/2002 |
| KR | 10-0961186 | 6/2010 |
| KR | 10-1044492 | 6/2011 |

OTHER PUBLICATIONS

Japan Patent Office Application Serial No. 2012-161393, Office Action dated Sep. 17, 2013, 3 pages.
Kim, et al., "Method of Recloser-Fuse Coordination in a Power Distribution System With Superconducting Fault Current Limiter," IEEE Transactions on Applied Superconductivity, Vol. 20, No. 3, June 2010, pp. 1164-1167.
Korean Intellectual Property Office Application Serial No. 10-2011-0073227, Office Action dated Jul. 18, 2012, 4 pages.
Japan Patent Office Application Serial No. 2012-161393, Office Action dated Feb. 4, 2014, 2 pages.
The State Intellectual Property Office of the People's Republic of China Application Serial No. 201210254354.X, Office Action dated Apr. 23, 2014, 7 pages.

* cited by examiner

*Primary Examiner* — Jared Fureman
*Assistant Examiner* — Terrence Willoughby
(74) *Attorney, Agent, or Firm* — Lee, Hong, Degerman, Kang & Waimey

(57) ABSTRACT

Provided is a protection coordination system. The system includes a current limiter arranged on a line between a first relay and a second relay to limit a fault current generated to within a predetermined scope.

3 Claims, 6 Drawing Sheets

PROTECTION COORDINATION SYSTEM

Pursuant to 35 U.S.C. §119 (a), this application claims the benefit of earlier filing date and right of priority to Korean Patent Application No. 10-2011-0073227, filed on Jul. 22, 2011, the contents of which is hereby incorporated by reference in their entirety.

BACKGROUND OF THE DISCLOSURE

1. Field of Endeavor

The present disclosure relates to a protection coordination system, and more particularly to a protection coordination system configured to be used in an electric power distribution system.

2. Background

Generally, relay operating characteristics and their setting must be carefully coordinated in order to achieve selectivity. The aim is basically to switch off only the faulted component and to leave the rest of the power system in service in order to minimize supply interruptions and to assure stability.

Protection should be as sensitive as possible to detect faults at the lowest possible current level. At the same time, however, it should remain stable under all permissible load, overload and through-fault conditions.

FIG. 1 is an exemplary view illustrating an electric power distribution system according to prior art, and FIG. 2 is a graph illustrating a protection coordination method in a plurality of OCRs (Over Current Relays, 31, 32) in FIG. 1.

Referring to FIG. 1, the power distribution system includes the plurality of OCRs (31, 32) on a load line, and if a fault current occurs on the line, a circuit is switched to short-circuit for protection of the line, where the OCRs perform the protection coordination.

Referring to FIG. 2, the first OCR (31) performs an instantaneous trip operation at 40,000 A or more currents, and performs a timer action at 40,000 A or less. Furthermore, the second OCR (32) performs an instantaneous trip operation at 2,500 A or more currents, and performs a timer action at 2,500 A or less.

For example, in a case a current of 2,000 A is generated at 'F' point of FIG. 1, both the first and second OCRs (31 and 32) performs the timer action, where the second OCR (32) operates at approximately 0.2 second and the first OCR (31) operates at approximately 0.8 second.

Furthermore, in a case a current of 2,500 A is generated at 'F' point of FIG. 1, the second OCR (32) performs the instantaneous trip operation, and the first OCR (31) performs a timer action, such that the second OCR (32) instantly operates at 0.04 second while the first OCR (31) operates at approximately 0.5 second for protection coordination.

However, in a case a current of 5,000 A is generated at 'F' point of FIG. 1, both the first and second OCRs (31 and 32) operate almost at the same time (0.05 second and 0.04 second respectively) because the point is in an instantaneous operation section. That is, for smooth protection coordination, it is sufficient that only the second OCR (32) operates to remove an A section that includes the F point where the fault has occurred, but in this case, the first and second OCRs (31 and 32) simultaneously operate to remove a B section, causing a problem of removing a wide section.

SUMMARY OF THE DISCLOSURE

The present disclosure has been made to solve the foregoing problem(s) of the prior art, and therefore an object of certain embodiments of the present invention is to provide a protection coordination system configured to limit a fault current that is generated during power failure by arranging a current limiter on a transmission line of power distribution system, whereby an instantaneous protection coordination can be provided among relays.

In one general aspect of the present disclosure, there is provided a protection coordination system, the system comprising: a first relay arranged on a first load line of a distribution power system; a second relay arranged on a second load line farther distanced from the center of the distribution power system than the first load line; and a current limiter arranged on a line between the first and second relays to limit a fault current generated on the second load line to within a predetermined scope.

Preferably, but not necessarily, a current at a start point of an instantaneous operation section of the first relay is greater than a current at a start point of an instantaneous operation section of the second relay.

Preferably, but not necessarily, the current limiter comprises a detecting unit for detecting a fault in a case the fault is generated at the second load line, and transmitting an open signal to a switch; the switch opened by the open signal; and a current limit resistor connected in parallel to the switch to reduce an incoming fault current in a case the switch is opened.

Preferably, but not necessarily, the current limiter limits a fault current to a section between the start point of the instantaneous operation section of the second relay and the start point of the instantaneous operation section of the first relay.

Preferably, but not necessarily, the current limiter adjusts a value of the current limit resistor by limiting a fault current to a section between the start point of the instantaneous operation section of the second relay and the start point of the instantaneous operation section of the first relay.

The protection coordination system according to the present disclosure has an advantageous effect in that protection coordination disabled section among relays can be removed by limiting a fault current to a predetermined section.

BRIEF DESCRIPTION OF THE DRAWINGS

The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
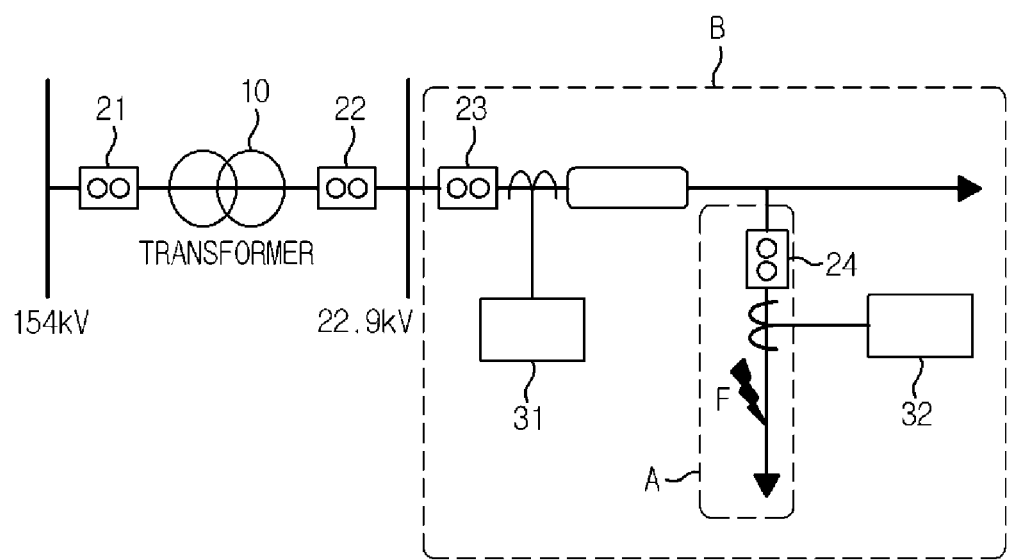
FIG. 1 is an exemplary view illustrating an electric power distribution system according to prior art.
Figure 2:
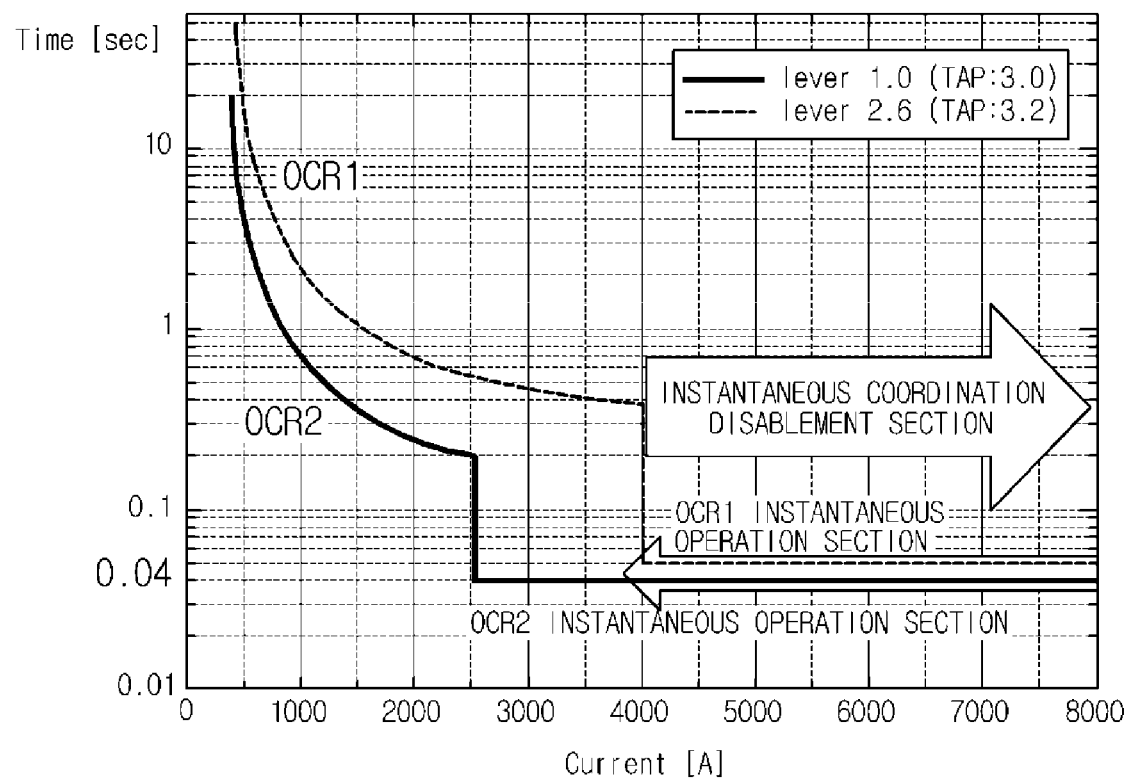
FIG. 2 is a graph illustrating a protection coordination method in a plurality of OCRs (31, 32) in FIG. 1.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a protection coordination system according to the present disclosure will be described in detail with reference to the accompanying drawings.

Figure 3:
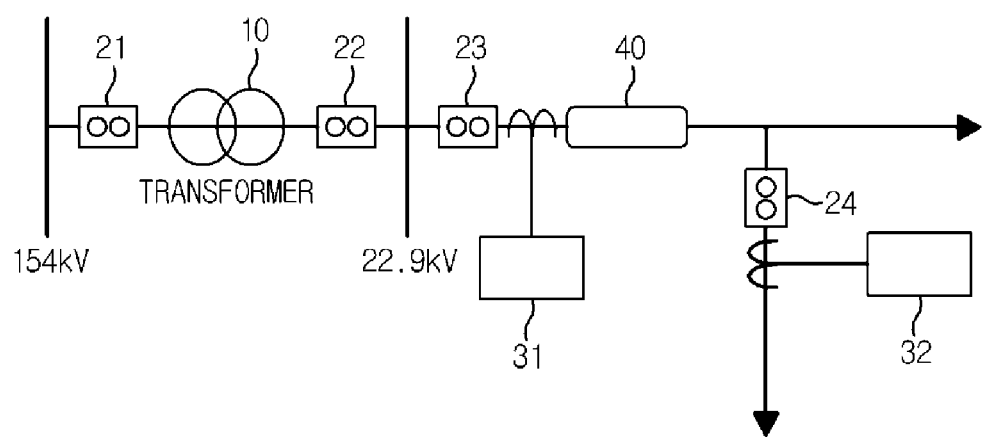
FIG. 3 is a schematic block diagram illustrating a protection coordination system according to an exemplary embodiment of the present disclosure.

FIG. 3 is a schematic block diagram illustrating a protection coordination system according to an exemplary embodiment of the present disclosure.

Referring to FIG. 3, although the protection coordination system according to the present disclosure is applicable to a general electric power distribution system that includes and illustrates a transformer (10) and circuit breakers (21, 22, 23 and 24), the constituent parts are not limited thereto, such that other parts irrelevant to the present disclosure will be omitted in detailed description and explanation thereto.

To be more specific, the protection coordination system is applicable to a load line of an electric power distribution system, and includes, at each load line, first and second OCRs (31 and 32) and a current limiter (40). The second OCR (32) is arranged on a load line farther distanced from that of the first OCR (31), the placement of which has influence to an OCR curve.

Although the first and second OCRs (31, 32) as relays arranged on the load line have been described in the present disclosure, the relays are not limited thereto, and the number of relays may be determined based on the number of load lines. Furthermore, although one current limiter (40) has been described in the present disclosure, it should be apparent to the skilled in the art that the current limiter is not limited thereto, and the number of current limiters may be determined based on the number of relays.

Figure 4:
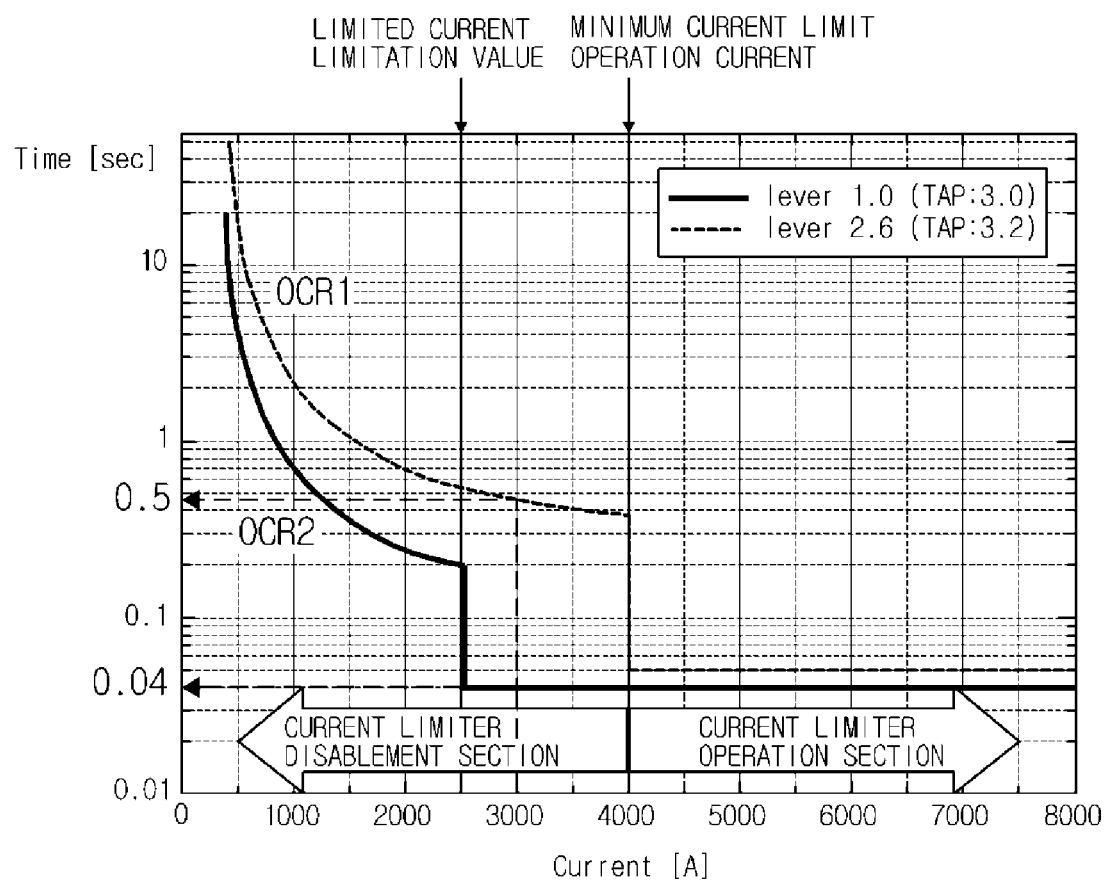
FIG. 4 is a graph illustrating a protection coordination method according to an exemplary embodiment of the present disclosure.

FIG. 4 is a graph illustrating a protection coordination method according to an exemplary embodiment of the present disclosure, where instantaneous action and time action sections of the first and second OCRs (31 and 32), and an operation section of the current limiter (40) of FIG. 4 are exemplified, and it should be apparent that values of which are not limited thereto. First, configuration and operation of the current limiter (40) will be described with reference to FIGS. 5 and 6.

Figure 5:
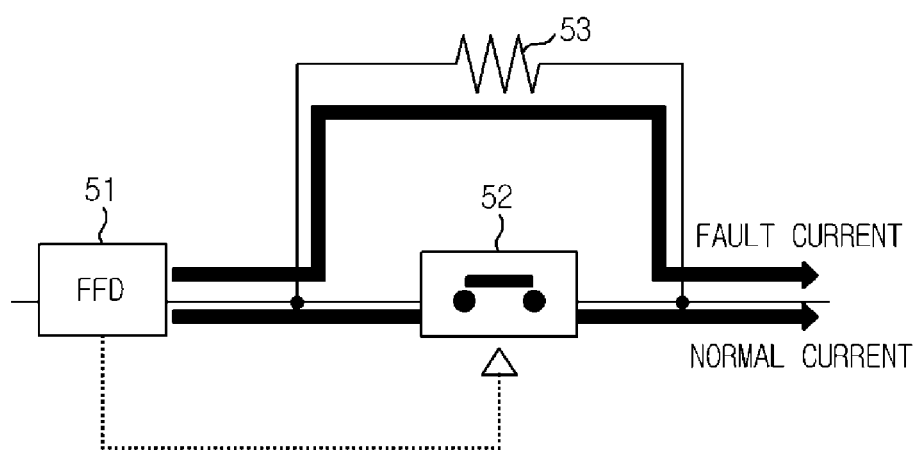
FIG. 5 is a detailed circuit diagram illustrating a current limiter of FIG. 3 according to an exemplary embodiment of the present disclosure.
Figure 6:
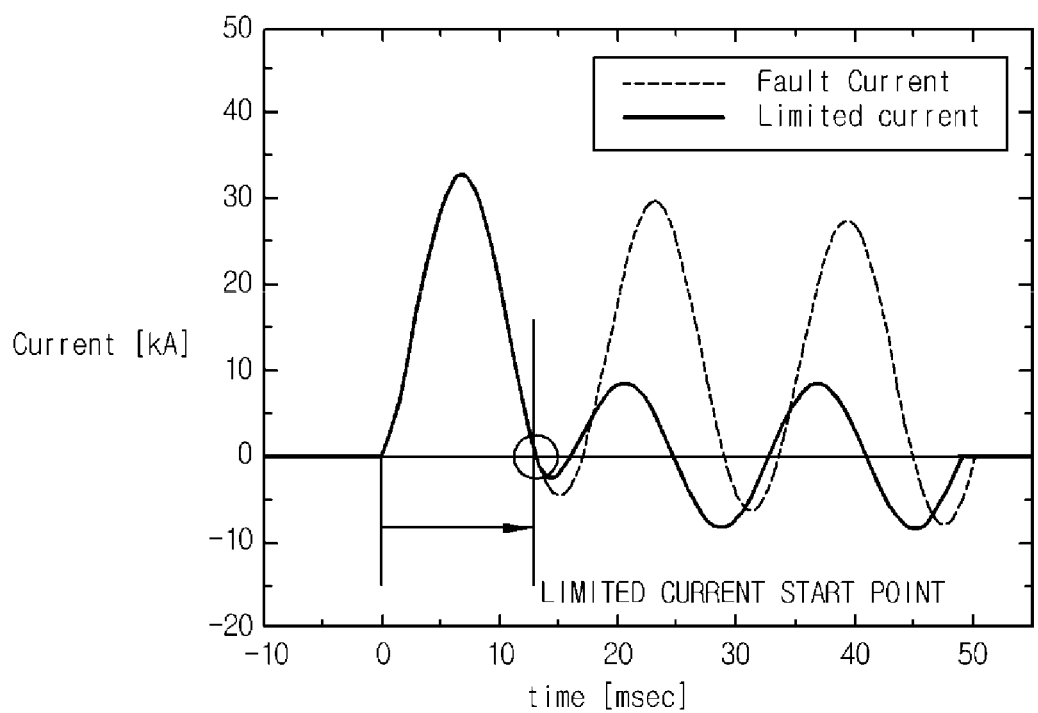
FIG. 6 is a schematic current graph illustrating an operation of a current limiter of FIG. 5 according to an exemplary embodiment of the present disclosure.

FIG. 5 is a detailed circuit diagram illustrating a current limiter of FIG. 3 according to an exemplary embodiment of the present disclosure, and FIG. 6 is a schematic current graph illustrating an operation of a current limiter of FIG. 5 according to an exemplary embodiment of the present disclosure.

As illustrated in the figures, the current limiter (40) according to the present disclosure includes an FFD (Fast Fault Detector, 51), a high speed switch (52) and a current limit resistor (53).

The FFD (51) detects a fault current at a high speed, in a case the fault current is generated, and transmits an open signal to a high speed switch (52), where the high speed switch (52) so switches as to allow a main circuit is turned off by the open signal from the FFD (51). The current limit resistor (53) directly reduces a fault current detoured to a current limit circuit, in a case the fault current is generated, by the main circuit of the high speed switch (52) being turned off. Now, operation of the current limiter will be described.

In a case a fault is generated in a system, the FFD (51), set up in a predetermined value that determines whether there is generated a fault, detects the fault at a high speed, and transmits an open signal of the high speed switch (52) to the high speed switch (52).

The current (normal current) flowing toward the high speed switch (52) closed under a normal state is such that, in a case a fault is generated, the high speed switch (52) is opened by the open signal transmitted from the FFD (51), and the fault current detours a path located with the current limit resistor (53), whereby strength of current is reduced as shown in a thick waveform of FIG. 6. However, it should be noted that the current limiter (40) in the present disclosure shows a most fundamental current limiter, and is not limited thereto, other types of current limiters that include the same functions as those of the current limiter are not ruled out.

Now, operation of the protection coordination system according to the present disclosure will be described with reference to FIGS. 3 and 4.

Referring to FIGS. 3 and 4, it is exemplarily assumed that the first OCR (31) is in an instantaneous operation section of 4,000 A or more, and the second OCR (32) is in an instantaneous operation section of 2,500 A or more.

In the examples thus mentioned, although the current limiter (40) determines the current of 4,000 A or more as a fault current, there is no need of removing the fault current once for all and it suffices that the fault current up to the instantaneous operation section of the second OCR (32) be limited. The limitation of the fault current can be carried out by setting the current limit resistor (53) at a proper value with reference to FIG. 6.

That is, the current limiter (40) limits the current from a point where the instantaneous operation section of the second OCR (32) starts to a point where the instantaneous operation section of the first OCR (31) starts. It should be apparent to the skilled in the art that the values in the present disclosure are just exemplary and the present disclosure is not restricted thereto.

Furthermore, it is also assumed that a fault current of more than 4,000 A is generated at the 'F' point of FIG. 1 by application of the current limiter (40) to the distribution system as shown in FIG. 3, for example.

In a case a fault current of 5,000 A is generated at a point of FIG. 3 corresponding to the 'F' point of FIG. 1, the current limiter (40) determines it as a fault current; the current limiter (40) limits the fault current to an arbitrary current from a point where the instantaneous operation section of the second OCR (32) starts (2,500 A of FIG. 4) to a point where the instantaneous operation section of the first OCR (31) starts (4,000 A of FIG. 4).

For example, in a case the fault current is limited to 3,000 A by the current limiter (40), the second OCR (32) carries out the instantaneous operation to operate at 0.04 second, and the first OCR (31) carries out the timer action at operate at 0.5 second. That is, there is generated a great time coordination difference to allow only the second OCR (32) to operate instantaneously, whereby only the section of FIG. 3 corresponding to 'A' section of FIG. 1 can be removed.

If a section corresponding to the 'A' section of FIG. 1 present with the fault is removed, the first OCR (31) cannot recognize the fault and maintains the normal state, whereby a section where protection coordination is disabled in the relays can be effectively removed.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A protection coordination system comprising:
 a first relay arranged on a first load line of a distribution power system;
 a second relay arranged on a second load line at a point further from a center of the distribution power system than the first load line, wherein a current at a start point of an instantaneous operation section of the first relay is greater than a current at a start point of an instantaneous operation section of the second relay; and
 a current limiter arranged on a line between the first and second relays and configured to limit a fault current generated on the second load line to within a predetermined scope,
 wherein the current limiter includes:
 a detecting unit configured to detect the fault current generated on the second load line and further configured to transmit an open signal to a switch;
 the switch configured to be opened by the open signal; and
 a current limit resistor connected in parallel with the switch and configured to reduce the fault current when the switch is opened.

2. The system of claim 1, wherein the current limiter is further configured to limit the fault current to a section between the start point of the instantaneous operation section of the second relay and the start point of the instantaneous operation section of the first relay.

3. The system of claim 1, wherein the current limiter is further configured to adjust a value of the current limit resistor by limiting the fault current to a section between the start point of the instantaneous operation section of the second relay and the start point of the instantaneous operation section of the first relay.

* * * * *